No. 710,461. Patented Oct. 7, 1902.
A. S. HOYT.
PROCESS OF UTILIZING BY-PRODUCTS OF THE MANUFACTURE OF STARCH.
(Application filed May 4, 1901.)
(No Model.)
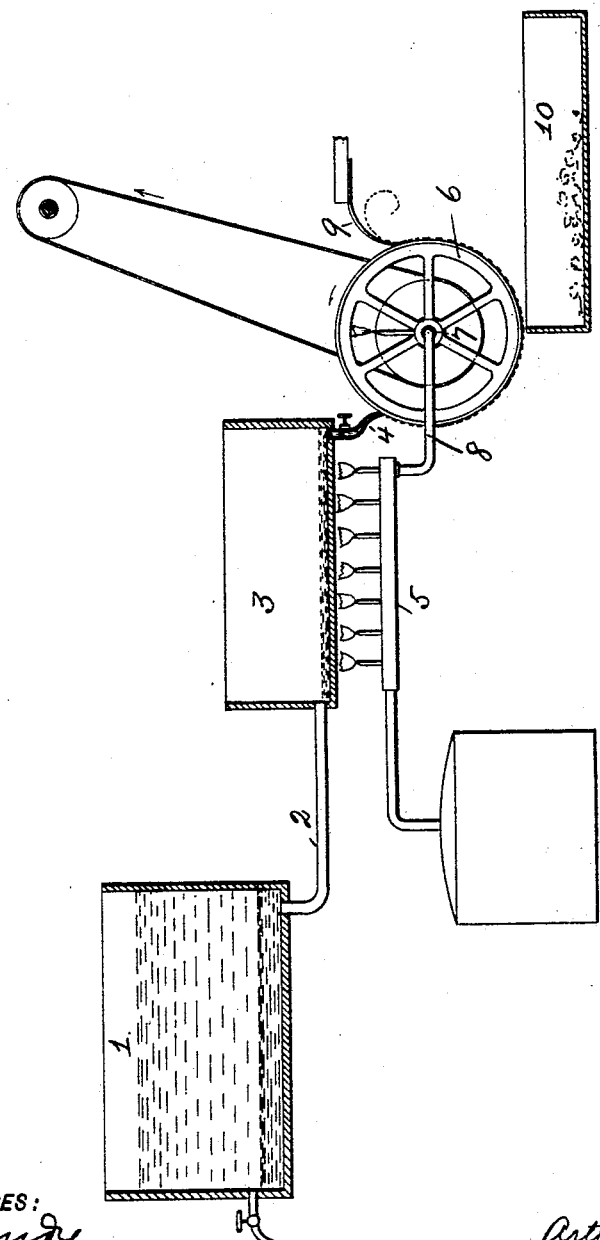
WITNESSES:
INVENTOR
Arthur S. Hoyt
BY William R. Baird
HIS ATTORNEY

UNITED STATES PATENT OFFICE.

ARTHUR S. HOYT, OF BROOKLYN, NEW YORK.

PROCESS OF UTILIZING BY-PRODUCTS OF THE MANUFACTURE OF STARCH.

SPECIFICATION forming part of Letters Patent No. 710,461, dated October 7, 1902.

Application filed May 4, 1901. Serial No. 58,803. (No specimens.)

*To all whom it may concern:*

Be it known that I, ARTHUR S. HOYT, a citizen of the United States, residing in the borough of Brooklyn, in the city of New York, in the county of Kings and State of New York, have invented a new and useful Improvement in Processes of Utilizing By-Products of the Manufacture of Starch, of which the following is a specification.

My invention relates to the utilization of certain by-products evolved in the manufacture of starch from wheat-flour; and its novelty consists in the steps of the process employed in so doing.

In general terms in the manufacture of starch from wheat-flour by mechanical processes the wheat-flour is first kneaded into a stiff paste with water. After permitting this to rest for a short time—say one or two hours—it is washed through a fine sieve, whereby the starch is liberated and the greater part of the gluten retained as a sticky elastic mass on the sieve. The washing is continued so long as the water remains milky. A further separation of the starchy matters thus held in suspension in the water then takes place. This may be accomplished by centrifugal drums, in which the heavier particles are driven to the circumference and the lighter particles are caused to collect at the center of the machine, or it may be accomplished in settling-tanks, the heavier particles slowly collecting at the bottom of the vessel and the lighter particles remaining in suspension in the supernatant liquid.

The starch of commerce, and which it is the aim of the starch manufacturer to secure, consists of the material having the greater density, which collects at the periphery of the centrifugal or at the bottom of the settling-tank.

My invention has to do with the supernatant liquid referred to in the above operation. In starch factories this is usually allowed to go to waste.

I have discovered that the particles of matter held in suspension in the supernatant liquid above referred to are composed of two kinds of materials—namely, a starchy substance and certain albuminous compounds, the nature of which is immaterial to the present purpose.

In carrying out my invention I first remove the bulk of the water from the liquid in question. This may be done by purely mechanical means or by the aid of chemicals or by heat. The method which I prefer is to draw the liquid into large tanks of any usual size and material and allow it to settle for several hours until the upper portion of the liquid becomes measurably clear. This portion of the liquid I find generally contains certain albuminoids, which in the course of time might settle to the bottom of the tank with the rest of the solid material, but which on account of their low specific gravity are not likely to do so within a reasonable time. To hasten this settling process, I coagulate the albuminoids by a suitable material—for instance, alum in solution—and this enables me to draw off the clear liquid sooner. The small portion of alum employed may be subsequently neutralized by a proper amount of alkali. This coagulation may also be secured by the action of heat. The clear liquid is decanted from the precipitate in any suitable manner.

It may be more convenient to cause the removal of the water by evaporation, and this may be done by heating over a slow fire or by indirect steam heat, and thus permitting the water to be evaporated without bringing it to boiling-point; but I prefer the method by coagulation and the neutralization of the coagulating material on account of the short time required for its efficient action.

I next cook the residue in the following manner: From the bottom of such a settling-tank I draw the liquor into a digester or cooker, to which heat may be applied in any suitable manner, or I cause it to be passed through pipes, which may be suitably heated by external means, and subjected to the action of heat for a short time (from three to fifteen minutes) until transparency, or "translucency" may, perhaps, be the better term to employ, ensues and it has been changed into the form of an opalescent jelly. I next dry the cooked product. For that purpose I first spread it out thin to permit as large a surface as possible to be subjected to the action of the drying medium and then cause the removal of the moisture either by a stream of air passing over it or by heat. I prefer to use the latter method, and I have found it convenient to do so by feeding a stream of the cooked material over a rotating heated roller. As the stream is permitted to be spread out thinly over the surface of the heated roller, it quickly dries and clings thereto in a thin sheet, like paper. Suitable means are provided for removing the dried flakes from the roller—for instance, a knife-edge placed close to its periphery—and these flakes are allowed to accumulate in a receptacle suitably placed for the purpose. I then reduce the dried residue to a finely-divided state either by grinding or in any other suitable manner. The resulting powder is white in color and has a specific gravity approaching that of water at the normal temperature and pressure and is soluble in cold water, in which it forms a clean, light, and peculiarly sticky paste adapted for very many purposes useful in the arts.

In carrying out this process I make use of a form of apparatus illustrated in the accompanying drawing; but of course it will be understood that the steps of the process may be carried out independently of the particular species of mechanism described or with other or equivalent mechanisms without altering the scope of my invention.

In the drawing there is represented diagrammatically the form of apparatus referred to.

1 is the settling-tank, provided at or near its bottom with a suitable aperture, at which is secured a pipe 2, which leads to the digester or cooker 3. This digester is provided with a flaring mouth 4, which permits the material to be discharged therefrom in a thin wide stream. A suitable source of heat-supply—for instance, a gas-burner 5—is employed to supply the heat necessary for the desired purpose. The roller 6 is mounted in suitable bearings 7 and provided with means, as the pipes 8, whereby heat can be supplied to the interior thereof and placed in close proximity to the spout 4, so that the discharging stream of material is spread thereon in a wide sheet. This sheet is caused by the heat of the roller to cling thereto, and it closely adheres until the rotation of the roller 6 brings it in contact with the knife 9, which is so placed that it may be adjusted very close to the outer surface of the roller, and this strips off the sheet of dried material and causes it to be discharged into any suitable receptacle, as the box 10. From this box it can be removed and ground to powder or reduced to a finely-divided state by other suitable means.

What I claim is—

1. The process of utilizing the waste product contained in water from which wheat-starch is removed, which consists in separating the bulk of the water therefrom, heating the residue to jelly-like consistency, drying the same and finally reducing it to a powder.

2. The process of utilizing the waste product contained in the water from which wheat-starch is removed, which consists, first, in removing the bulk of the moisture therefrom, second, cooking the same until transparency ensues, third, spreading the same out thin over a suitable surface, fourth, removing the remainder of the moisture therefrom and fifth, reducing the dried material to a finely-divided state.

3. The process of utilizing the waste product contained in the water from which wheat-starch is removed, which consists, first, in coagulating the albuminoids therein, second, removing the bulk of the moisture therefrom, third, cooking the residue to transparency, fourth, drying the cooked product and fifth, reducing the same to a finely-divided state.

4. In the process of forming an adhesive from the gluten-water of wheat-starch manufacture, separating the solid matter from the bulk of the water, heating said solid matter to jelly-like consistency and then drying the same.

5. In the process of forming an adhesive from the gluten-water of wheat-starch manufacture, separating the solid matter from the bulk of the water, heating said solid matter to jelly-like consistency and drying the same in thin layers.

Witness my hand this 3d day of May, 1901, in the presence of two subscribing witnesses.

ARTHUR S. HOYT.

Witnesses:
MABEL K. WHITMAN,
HERMAN MEYER.